H. C. SMITH.
DOOR HANGER TRACK.
APPLICATION FILED OCT. 26, 1910.
1,074,021.
Patented Sept. 23, 1913.
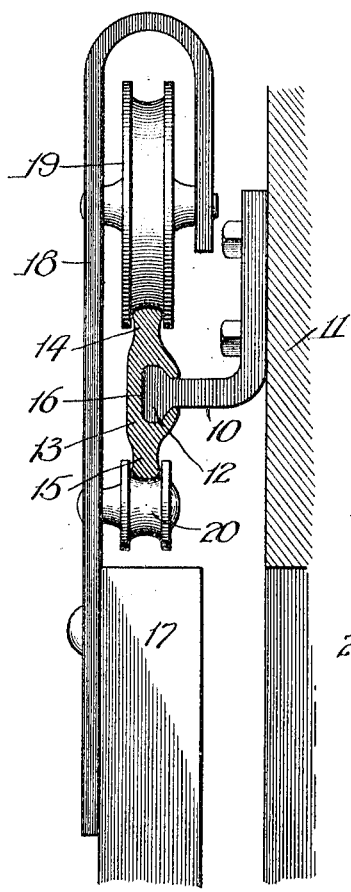
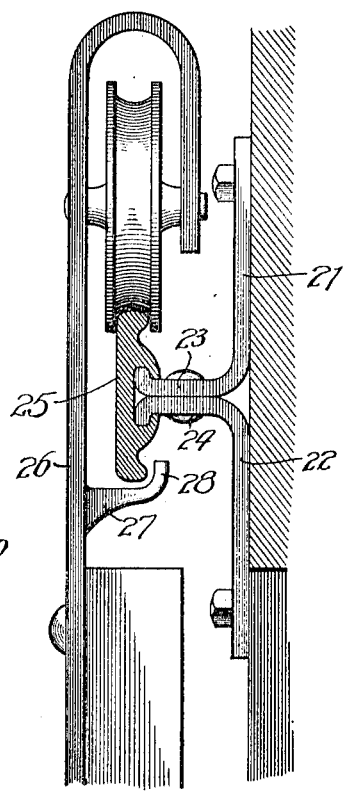
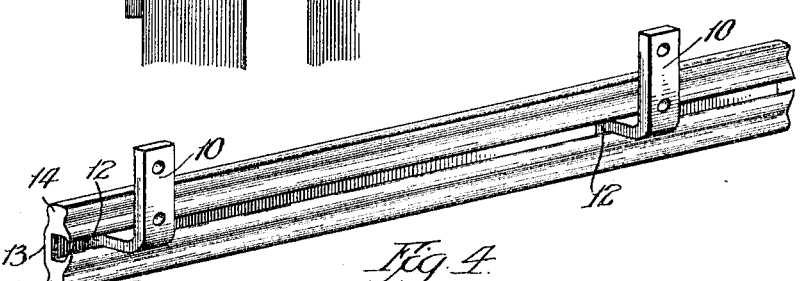
Witnesses:
Inventor:
Henry C. Smith
By Linthicum Belt & Fuller
Attys.

UNITED STATES PATENT OFFICE.

HENRY C. SMITH, OF OAK PARK, ILLINOIS, ASSIGNOR TO ALLITH MANUFACTURING COMPANY, OF CHICAGO, ILLINOIS, A CORPORATION OF ILLINOIS.

DOOR-HANGER TRACK.

1,074,021. Specification of Letters Patent. Patented Sept. 23, 1913.

Application filed October 26, 1910. Serial No. 589,193.

*To all whom it may concern:*

Be it known that I, HENRY C. SMITH, a citizen of the United States, residing at Oak Park, in the county of Cook and State of Illinois, have invented certain new and useful Improvements in Door-Hanger Tracks, of which the following is a specification.

This invention relates to a metallic track used for the support of the wheeled hangers for sliding doors and the purpose of the invention is to provide an exceedingly strong track; to provide a track and bracket so formed that the parts may be conveniently assembled and the brackets positioned as closely together as desired and to provide a track which shall be economical to manufacture.

It has for a long time been sought to produce a door hanger track which should have great rigidity both in a vertical and lateral direction, adaptability for association with adjustable brackets and which could be economically manufactured. Some of these objects have been secured in the tubular slotted door hanger track but obviously the tubular slotted track must be produced either by drawing or bending, and owing to its method of manufacture is much more expensive than the ordinary so-called flat track consisting of bars which are rectangular in cross section. These flat bar tracks are objectionable for the reason that they are not adjustable with relation to the brackets, further because of the liability of breakage of the attached brackets in shipment and handling and further because they are weak unless an excessive amount of metal is used.

My improved door hanger track embodies all of the desirable features of the tubular track and of the flat track; that is to say, it is strong, economical of manufacture, can be used with adjustable brackets and affords a secure track in that it is provided with a stay-on feature, namely, a device for preventing the wheeled hanger from jumping the track.

My improved track is composed of a rolled section, one edge of which affords a track for the hanger and the body of which is provided with a longitudinal groove preferably T-shaped and adapted to receive slidingly therein the suitably formed head of a track supporting bracket. The bracket and the track receiving grooves are disposed in the same vertical plane and the lower edge of the section may afford a track or guiding surface to receive an under-running wheel or hook carried by the hanger, this providing a stay-on feature. Preferably the section will be such as to present similar track surfaces so that the track may be used either edge up; in other words, the track is reversible. Within the broader scope of my invention the track surface may be provided upon one edge only.

Referring to the drawings, Figure 1 is a side elevation partly in section showing my improved track with a door mounted thereon. Fig. 2 is a view similar to Fig. 1 but showing a somewhat different form of bracket and stay-on device. Fig. 3 is a section of a modification of the track shown in Figs. 1 and 2, and Fig. 4 is a perspective view of the form of track and bracket shown in Fig. 1.

The brackets 10, shown in Figs. 1 and 4 of the drawings, are formed in a single piece say of malleable cast iron and are secured by suitable screws to a wall 11. These brackets are provided with a bulbous end 12, its contour conforming to the groove in the track about to be described. The track is adapted to be formed by rolling and comprises a main web 13 which has upper and lower track surfaces 14, 15. On one of its lateral sides and midway of its width I prefer to form a longitudinal undercut groove 16, in which the end 12, of the bracket 10, is adapted to be seated. The door 17, is provided with a hanger 18, properly secured thereto by bolts, the hanger as shown carrying a track wheel or roller 19, having its periphery grooved to correspond to the track surface 14. This roller may be substituted by a sliding hook. In Fig. 1, I have shown a form of stay-on which comprises the lower guide wheel 20, having its periphery grooved to fit the lower track surface 15.

The track and bracket of my invention are so designed as to be exceedingly simple, yet possessing the features which will result in the greatest strength in a given amount of material, that is, the metal is so distributed that great vertical and transverse strength is secured. Great vertical resistance is secured by reason of the fact that the point of suspension of the door is in substantially the same plane as the point of connection of the bracket. One of the important features is that of adaptability inasmuch as the brackets may be spaced at any desired distance apart. This feature is present in a tubular slotted track, but as such track requires either drawing or bending, it cannot be produced so economically as my track which is adapted to be rolled and can be produced very rapidly and therefore cheaply.

I have shown in Fig. 2 a bracket of slightly modified construction. In this view, the bracket is composed of two parts 21, 22 united at 23, by a rivet 24. The joined ends are flanged outwardly to form a bearing end for coöperation with the slot in the track 25. In this view I have also shown a different form of stay-on, having eliminated the small track wheel of Fig. 1, the hanger 26, being provided with a bracket, integral or otherwise, having an upturned or hooked portion 28, which is adapted to fit around the lower surface of the track 25.

In Fig. 3 I have shown a modification of the track illustrated in Figs. 1 and 2. In this view the track is composed of the main web 29, having the upper flange or track surface 30.

Obviously my invention is not limited to the exact form of the track section or to the exact configuration of groove and bracket head, so long as the several parts are of such form and adapted to so coöperate as to secure the objects hereinabove set forth.

I claim:

1. A rolled metal track having a longitudinal T-shaped groove and an upwardly extending marginal rib or flange terminating in a rounded head affording a track surface, substantially as described.

2. In a device of the class described, a rolled metal track having an undercut groove adapted to accommodate the enlarged heads of track supporting brackets, said track having an upper extension affording a track surface substantially in the same vertical plane of the undercut groove, substantially as described.

3. In a device of the class described, a rolled metal track having a longitudinal bracket groove, and oppositely extending marginal ribs or flanges affording upper and lower track surfaces, substantially as and for the purpose specified.

4. In a device of the class described, a rolled metal track having a longitudinal bracket groove, and oppositely extending marginal ribs or flanges affording upper and lower track surfaces, said ribs or flanges being in substantially the same vertical plane as the said longitudinal groove, substantially as described.

HENRY C. SMITH.

Witnesses:
M. ROBERTSON,
MILTON MILLER.

---

Copies of this patent may be obtained for five cents each, by addressing the "Commissioner of Patents, Washington, D. C."